M. G. SCHENCK.
Tire-Upsetting Machine.

No. 165,261. Patented July 6, 1875.

Attest:
S. Parks
Jno. D. Patten

Inventor.
Martin G. Schenck
pr C. M. Parks
Atty.

UNITED STATES PATENT OFFICE

MARTIN G. SCHENCK, OF MARLBOROUGH, NEW JERSEY.

IMPROVEMENT IN TIRE-UPSETTING MACHINES.

Specification forming part of Letters Patent No. 165,261, dated July 6, 1875; application filed May 19, 1875.

*To all whom it may concern:*

Be it known that I, MARTIN G. SCHENCK, of Marlborough, Monmouth county, and State of New Jersey, have invented an Improvement in Tire-Upsetting Machines; and I do hereby declare the following to be a full and correct description of the same, reference being had to the accompanying drawings, in which—

Figure 1:
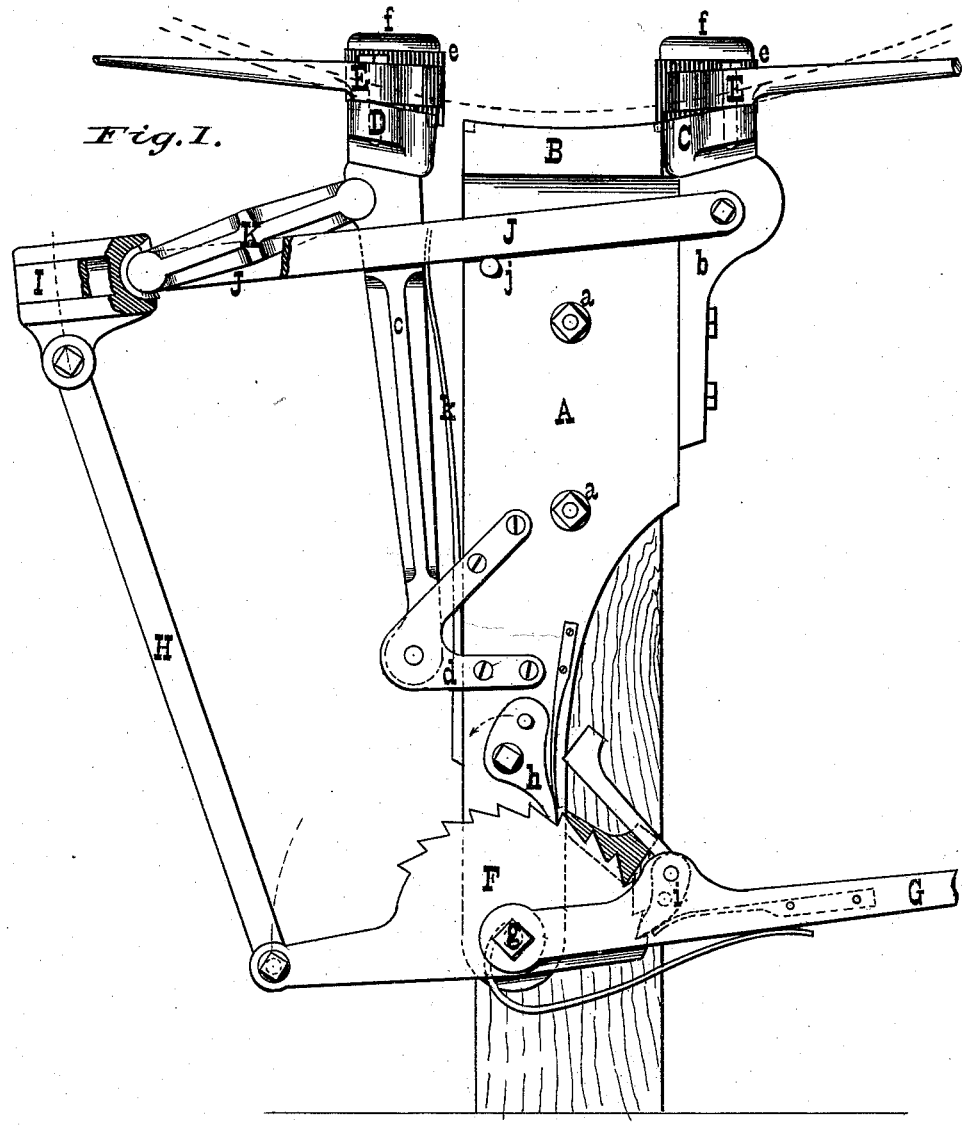
Figure 2:
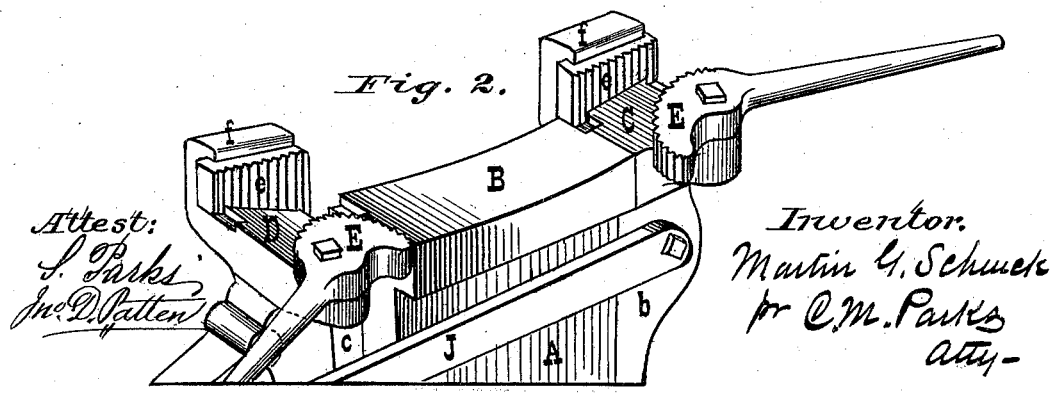

Figure 1 is a side view, and Fig. 2 is a perspective view, of the top of my machine, showing the clamps and anvil.

The object of my invention is to provide a machine for upsetting tires which may be operated by the foot, exerting great power, and leaving the hands free to manipulate the tire during the process of upsetting; and it consists in clamping parts of the tire upon each side of an anvil and contracting the tire by means of a series of levers operated by the foot.

In the drawing, A represents the body or frame of the machine secured to a post by means of the bolts $a\ a$. Upon the top of the body A is placed a steel anvil, B, curved upon the top to adapt it to the shape of the tire. Upon one side of the body A is bolted the bracket $b$, bearing one jaw, C, and upon the other side of the anvil B is a vibrating arm, $c$, pivoted in a brace-plate, $d$, secured to the body A, carrying upon its upper end another jaw, D. The jaws C and D consist of a steel bed, $e$, provided with teeth set in a flange, $f$, upon one side of the tire as it is held in position to be operated upon, and upon the other side of said tire is pivoted a toothed cam-lever, E, between which and the toothed bed $e$ the tire is clamped during the operation of upsetting. The jaw D, upon the vibrating lever $c$, pivoted in the brace-plate $d$, is operated by a series of levers hereinafter described. Pivoted upon a bolt, $g$, in the lower part of the bed A, is a ratchet-lever, F, and a foot-lever, G. Engaging in the ratchet of the lever F is the pawl $h$ upon the bed-piece A, and the pawl $i$ upon the inside of the foot-lever G. Pivoted to the back end of the lever F is the link H connecting the lever F to the head I. Securely fastened to the cast-iron head I is the double lever J J passing each side of the vibrating lever $c$ and bed-piece A, and is pivoted upon each side of the bracket $b$. Pivoted into the head I, and into the vibrating lever $c$, by suitable fin-joints, is the toggle-lever K pressing against the rear of the lever $c$.

The operation of my machine is as follows:

A tire heated to a suitable degree is placed upon the anvil B, and between the jaws of the clamps C and D. The cam-levers E E are then turned by means of their handles against the tire, clamping and holding it against the toothed plate $e$, the clamp D having been allowed to assume its greater distance from its clamp C, which distance is regulated by the spring $k$ between the lever $c$ and bed A, and the pin $j$ in the bed A, under the lever J, limiting its motion downward. Pressure is then applied upon the end of the lever G by the foot, and the pawl $i$ being engaged in the ratchet F, the head I is raised by means of the link H. As the head I rises, it carries with it the end of the toggle-lever K, and as the levers J and K come more and more into line with each other, the clamp D is moved toward the clamp C, compressing the tire between them. But as the foot-lever G reaches its limit, the tire is not yet sufficiently compressed; consequently the necessity of the ratchet and pawls. The foot being released, the pawl $h$ holds the ratchet, and the lever G is raised by the force of a spring secured upon the bolt $g$, and the first operation can be repeated. When the tire is sufficiently upset and hammered upon the anvil, and is released from the clamps, it becomes necessary to allow the clamp D to return to its original position. This is done by means of trip-pins upon the pawls and stops, the stop upon the foot-lever G tripping the pawl $h$, and the stop upon the bed A tripping the pawl $i$, as will be readily seen.

Having thus fully described my invention, what I claim, and desire to secure by Letters Patent, is—

1. In combination with the clamps of a tire-upsetting machine, the levers K and J, and foot-lever G, substantially as described.

2. In combination with the levers K and J, the ratchet-lever F with pawls $h$ and $i$, and foot-lever G, substantially as described.

3. The combination of the ratchet-lever F and foot-lever G with pawls $h$ and $i$, having trip-pins and stops, substantially as described.

The above specification of my said invention signed and witnessed at Freehold this 17th day of May, A. D. 1875.

MARTIN G. SCHENCK.

Witnesses:
JAS. T. HARTSHORNE,
FRANK B. MCDERMOTT.